March 10, 1970     G. W. SPOTTS     3,499,567
NECK STRUCTURE FOR THIN-WALLED PLASTIC CONTAINERS
Filed Oct. 9, 1967     2 Sheets-Sheet 1

INVENTOR
GERALD W. SPOTTS

BY

ATTORNEYS.

March 10, 1970   G. W. SPOTTS   3,499,567
NECK STRUCTURE FOR THIN-WALLED PLASTIC CONTAINERS
Filed Oct. 9, 1967   2 Sheets-Sheet 2

INVENTOR
GERALD W. SPOTTS

BY  *Colton + Stone*

ATTORNEYS.

United States Patent Office 3,499,567
Patented Mar. 10, 1970

3,499,567
NECK STRUCTURE FOR THIN-WALLED
PLASTIC CONTAINERS
Gerald W. Spotts, Blackwood, N.J., assignor to Shell Oil
Company, New York, N.Y., a corporation of Delaware
Filed Oct. 9, 1967, Ser. No. 673,572
Int. Cl. B65d 1/02
U.S. Cl. 215—31    7 Claims

ABSTRACT OF THE DISCLOSURE

The disclosure is directed to an improved neck structure for thin-walled plastic containers wherein the conventional bumper or casing ring conventionally formed as a ring-like structure completely encircling the neck is replaced by two partial rings which are separated by vertical walls. The purpose of separating the partial rings by vertical walls is to provide increased resistance to vertical capping forces applied by a conventional capping machine.

BACKGROUND OF THE INVENTION

The invention relates in general to plastic containers and, more particularly to thin-walled blow-molded plastic jugs having varying volumetric capacities. With the advent of improved blow-mold techniques, thin walled plastic containers are coming into greater prominence as liquid carrying containers. In order to successfully compete with the older type containers, it is desirable that plastic containers be equally susceptible of automatic machine handling operations.

In order to provide a guide structure to center a container in a capping machine, it is the usual practice to provide a ring-like protuberance on the container neck below the level of the lip which is commonly referred to as a bumper ring. This same projection is also frequently designated as the casing ring inasmuch as it may be grasped by automatic casing machinery.

No particular problem is presented by the formation of such a casing ring on the neck of a heavy-walled or relatively rigid container. In the case of thin-walled extremely light weight containers, such as for example a blow-molded 55 gram half-gallon container, however, the presence of such a ring-like projection so weakens the container neck that the same is unable to withstand vertical capping pressures in the range of 50–200 p.s.i. which are required to crimp a conventional laminated foil-paperboard closure known to the trade as a Dacro closure. The prior art blow-molded bottles provided with such a bumper or casing ring which is necessarily formed by an outward deformation of the neck wall, collapses like an accordion or bellows under such capping pressures. One solution which has been attempted is to increase the thickness of the neck wall but the disadvantages inherent in such an attempt to "beef up" the neck structure are substantial in terms of expense and appearance.

SUMMARY OF THE INVENTION

A primary object of the invention is to substitute for the neck encircling wall deformation which provides the conventional casing ring with its inherent low vertical thrust resistance characteristics, a plurality of such deformed neck wall portions separated by vertical wall portions. In such a neck wall construction, the vertical capping forces are borne, primarily, by the vertical wall portions rather than the inherently weaker outwardly bowed or deformed wall portions forming the projections which may be grasped by a casing machine as well as serving as guides for a capping machine.

A further object is to provide, in a thin-walled blow-molded plastic container, a neck structure whose wall thickness does not vary appreciably from that of the other parts of the container and which can successfully withstand a substantial vertical capping pressure.

BRIEF DESCRIPTION OF THE DRAWINGS

The foregoing and other advantages will be apparent from a consideration of the ensuing description taken in conjunction with the drawings, wherein.

DESCRIPTION OF THE PREFERRED EMBODIMENT

Figure 1:
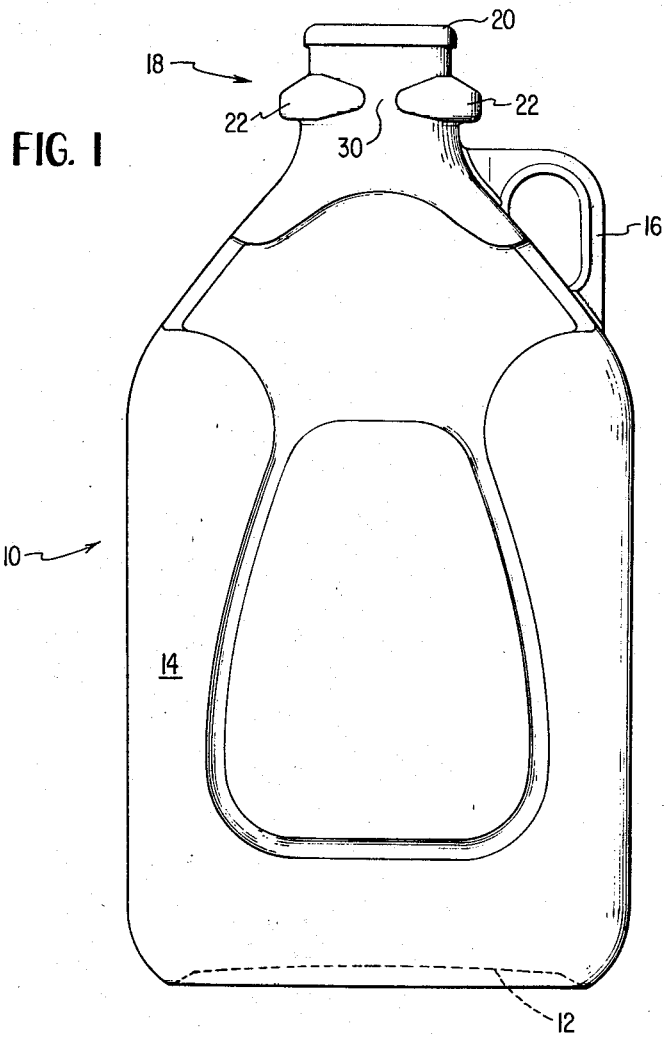
FIGURE 1 is a side elevational view of a thin-walled plastic container embodying an improved neck structure for resisting vertical capping forces.
Figure 2:
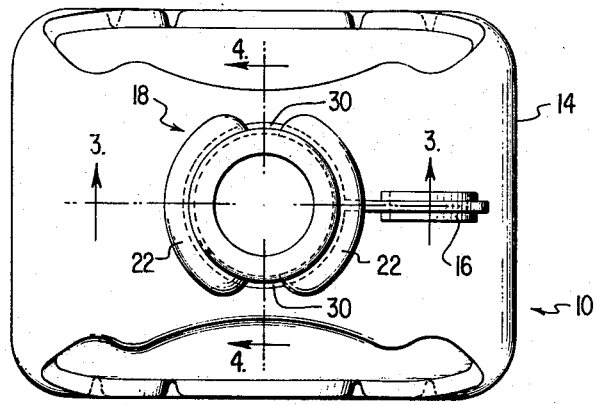
FIGURE 2 is a top plan view thereof.

In FIGURE 1 is illustrated a thin-walled blow-molded plastic container 10 having a bottom wall 12, upstanding peripheral walls 14 converging inwardly in the region of handle 16 to form a neck portion 18 terminating at the open upper end thereof in an annular lip 20. A pair of partial rings 22 are formed in neck portion 18 by outward deformation of diametrically opposed portions of the neck wall during blow-molding operations which forms parting lines 24 that intersect partial rings 22 causing a slight additional deposit of plastic material 26 on the inner surface of the partial rings in the immedate vicinity of the parting lines. Except for the aforementioned small parting line deposits the wall thickness of the partial rings is substantially the same as that defining the remainder of the container. A small additional plastic deposit 28 due to the presence of the mold parting lines is shown in FIGURE 3 adjacent lip 20.

Figure 5:
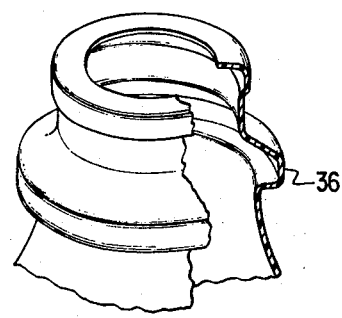
FIGURE 5 is a perspective view, partially broken away, of a conventional thin-walled plastic container illustrating the conventional bumper or casing ring.
Figure 6:
FIGURE 6 is a perspective view of a crimpable closure member.
Figure 7:
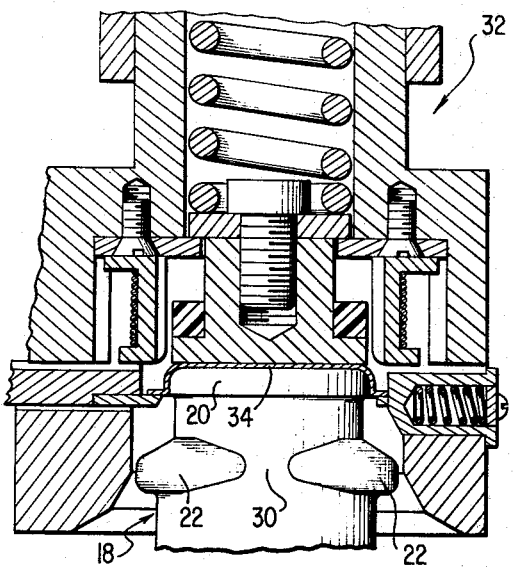
FIGURE 7 fragmentarily illustrates a cross sectional view of a capping machine station having a bottle neck appropriately positioned for a capping operation.
Figure 8:
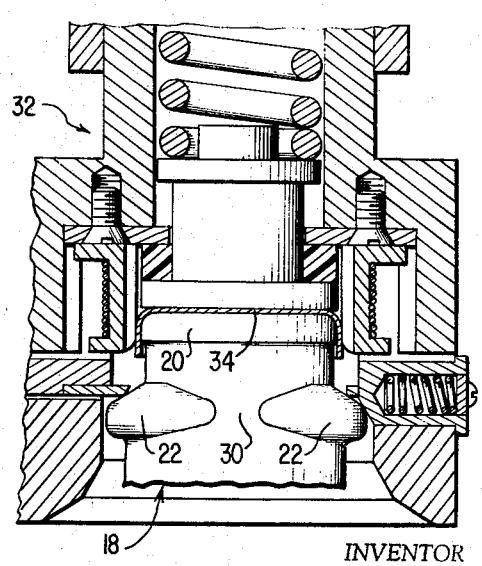
FIGURE 8 is a view similar to FIGURE 7 illustrating a second stage of the capping operation.

It is of particular importance that the adjacent ends of partial rings 22 are spaced apart by diametrically opposed undeformed neck wall portions 30 which are vertically oriented in relation to the capping pressures to be applied thereto during a typical capping operation as represented in FIGURES 7 and 8. These figures illustrate the manner in which partial rings 22 serve as guides for capping machine 32 prior to and during the crimping operation of closure member 34. The capping force required to crimp a conventional laminated foil-paperboard closure of the type shown in FIGURE 6 is quite substantial and normally exceeds 50 p.s.i. When a thin-walled plastic container having a conventional casing ring 36 and neck configuration as shown in FIGURE 5 is subjected to vertical capping forces of this magnitude, the neck wall structure collapses like an accordion at the weakened neck area created by the circumferentially continuous neck wall deformation forming the casing ring. Such collapse, of course, results in rupture of the bottle and leakage of the contained material.

Figure 3:
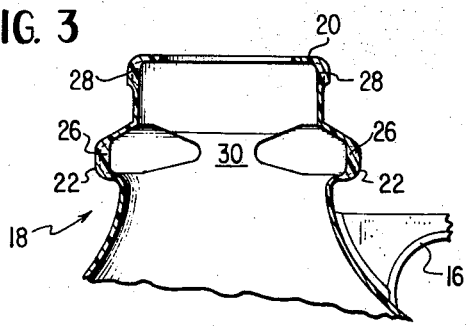
FIGURE 3 is a vertical sectional view taken on the line 3—3 of FIGURE 2.
Figure 4:
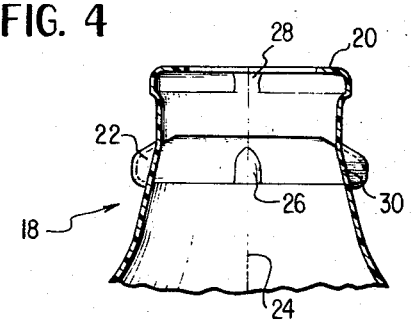
FIGURE 4 is a vertical sectional view taken on the line 4—4 of FIGURE 2.

In contrast, according to the invention, the container neck construction shown in FIGURES 3 and 4 provides vertical wall portions 30 to transmit vertical thrust forces to the main body portion of the container rather than transmitting the total force through an inherently weaker outwardly bowed wall portion as exemplified by the conventional bottle neck shown in FIGURE 5.

In actual practice, typical 55 gram half-gallon containers incorporating the novel neck construction herein described have been successfully capped on standard equipment. Similar containers weighing in excess of 70 grams with normal bumper ring design, of the type shown in FIGURE 5, failed to cap on the same equipment due to collapse of the bumper ring.

What is claimed is:

1. A thin-walled plastic container having a bottom wall and peripheral wall means converging inwardly adjacent the upper end thereof to form an open ended neck portion terminating in an upper lip adapted to receive a crimpable closure member, said neck portion including capping machine guides defined by diametrically opposed outwardly curved wall portions separated by diametrically opposed substantially vertical wall portions, said curved wall portions being substantially symmetrical about a plane extending through said vertical wall portions.

2. The container of claim 1 wherein said neck portion is generally circular in cross-section and said outwardly curved wall portions define a pair of partial ring structures lying in a substantially common horizontal plane below said upper lip when the container is in an upright position.

3. The container of claim 2 wherein partial ring structures each extend less than 180° about the periphery of the neck portion and merge with said opposed vertical wall portions.

4. A thin-walled plastic container having a bottom wall and upstanding peripheral wall means merging with an upper neck having an open upper end adapted to receive a crimpable closure, and said neck including capping machine guides defined by outwardly bowed wall portions on opposite sides thereof forming casing means and merging with interposed substantially vertical neck wall portions, the surfaces of said bowed wall portions adjacent the upper end and on opposite sides of the vertical wall portions being substantially mirror images.

5. The container of claim 4 wherein said outwardly bowed wall portions occupy a common horizontal plane below said open upper end when the container is in an upright position.

6. The container of claim 5 wherein said outwardly bowed wall portions define a pair of partial ring structures each of which extends around less than half the outer periphery of said neck.

7. A thin-walled plastic container having a bottom wall, upstanding peripheral wall means and a neck providing an upper end, capping machine guides and increased resistance to vertical thrust forces applied thereto during a capping operation, comprising: a pair of opposed outwardly bowed neck wall portions defining external partial ring shaped projections on said neck extending substantially equidistant from the axis of said contaianer beyond the confines of said upper neck end, and said ring shaped projections being separated intermediate their adjacent ends by substantially vertical wall portions to resist vertical forces imposed on said neck during a capping operation.

References Cited

UNITED STATES PATENTS

| D. 210,854 | 4/1968 | Anderson | 215—31 |
| 3,235,111 | 2/1966 | Whitton et al. | 215—1 |
| 3,343,698 | 9/1967 | Anderson et al. | 215—31 |

FOREIGN PATENTS 757,793   9/1956   Great Britain.

DONALD F. NORTON, Primary Examiner

U.S. Cl. X.R.

53—42; 215—1, 39